(12) United States Patent
Oki

(10) Patent No.: US 11,604,322 B2
(45) Date of Patent: Mar. 14, 2023

(54) OPTICAL TRANSCEIVER

(71) Applicant: Sumitomo Electric Industries, Ltd., Osaka (JP)

(72) Inventor: Kazushige Oki, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 163 days.

(21) Appl. No.: 16/849,598

(22) Filed: Apr. 15, 2020

(65) Prior Publication Data

US 2020/0333543 A1 Oct. 22, 2020

(30) Foreign Application Priority Data

Apr. 19, 2019 (JP) .............................. JP2019-080279

(51) Int. Cl.
*G02B 6/42* (2006.01)
*H04B 10/40* (2013.01)

(52) U.S. Cl.
CPC ......... *G02B 6/4268* (2013.01); *G02B 6/4246* (2013.01); *H04B 10/40* (2013.01)

(58) Field of Classification Search
CPC .. G02B 6/4268; G02B 6/4246; G02B 6/4273; G02B 6/428; G02B 6/4245; G02B 6/4256; H04B 10/40
See application file for complete search history.

(56) References Cited

U.S. PATENT DOCUMENTS

| | | | | |
|---|---|---|---|---|
| 11,169,337 B2 * | 11/2021 | Ishii | ..................... | H05K 7/2039 |
| 2005/0158052 A1 | 7/2005 | Larson | | |
| 2007/0237466 A1 * | 10/2007 | Togami | ................ | G02B 6/4219 |
| | | | | 385/92 |
| 2009/0010653 A1 | 1/2009 | AOKi | | |
| 2009/0219963 A1 * | 9/2009 | Mogi | ................... | G02B 6/4246 |
| | | | | 372/36 |
| 2011/0110048 A1 * | 5/2011 | Lima | .................... | H05K 1/0204 |
| | | | | 361/720 |

(Continued)

FOREIGN PATENT DOCUMENTS

| CN | 106061143 A | 10/2016 |
|---|---|---|
| JP | 2005-093507 A | 4/2005 |

(Continued)

*Primary Examiner* — Stephen S Sul

(74) *Attorney, Agent, or Firm* — Baker Botts L.L.P.; Michael A. Sartori

(57) ABSTRACT

An optical transceiver according to an embodiment includes: a housing having inner sides defining an inner space inside the housing; an optical module including a package, a semiconductor device, and a sleeve, the package being configured to house the semiconductor device, the semiconductor device generating a Joule heat, the sleeve being attached to an outside of the package, the sleeve being fixed to the housing with keeping the package away from the inner sides; a heat-conducting material filled between the package and one of the inner sides, the heat-conducting material including an oily component; and a sheet member being placed between the heat-conducting material and the package, the sheet member covering the heat-conducting material to prevent the oily component from reaching the optical module. The Joule heat is conducted from the package to the housing through the sheet member and the heat-conducting material.

3 Claims, 8 Drawing Sheets

(56) References Cited

U.S. PATENT DOCUMENTS

| | | |
|---|---|---|
| 2012/0045182 A1 | 2/2012 | Ishii et al. |
| 2016/0154177 A1* | 6/2016 | Han ..................... G02B 6/4251 385/14 |
| 2016/0159037 A1* | 6/2016 | Sakaguchi ................ B32B 9/04 428/212 |
| 2016/0295680 A1 | 10/2016 | Yoshimi |
| 2018/0375286 A1* | 12/2018 | Sato ........................ H01S 5/024 |

FOREIGN PATENT DOCUMENTS

| | | |
|---|---|---|
| JP | 2007-155863 A | 6/2007 |
| JP | 2009-04933 A | 3/2009 |
| JP | 2009-049333 A | 3/2009 |
| JP | 2011-215620 A | 10/2011 |
| JP | 2012-064936 A | 3/2012 |
| JP | 2014-119712 A1 | 6/2014 |

\* cited by examiner

OPTICAL TRANSCEIVER

TECHNICAL FIELD

An aspect of the present disclosure relates to an optical transceiver.

BACKGROUND

Japanese Unexamined Patent Publication No. 2012-64936 describes an optical transceiver including an optical subassembly on which a light emitting diode is mounted and a circuit board on which an IC is mounted. The optical subassembly and the circuit board are covered with a heat dissipation cover. The optical subassembly is formed of a ceramic package. On the back surface of the ceramic package on the circuit board side, a heat dissipation surface is provided. The heat dissipation surface is disposed so as to be orthogonal to the heat dissipation contact surface of the heat dissipation cover. To the heat dissipation surface, a heat dissipation block is thermally coupled. The heat dissipation block is fixed to the heat dissipation contact surface of the heat dissipation cover such that the heat dissipation block is slidably brought into intimate contact with the heat dissipation contact surface.

Japanese Unexamined Patent Publication No. 2007-155863 describes a heat dissipation structure for an optical transceiver including a butterfly type optical module having a sleeve part and a box part and a housing that accommodates the optical module. The sleeve part is directly fixed to the inner surface of the housing. The box part is fixed to the inner surface of the housing through an auxiliary member. Between the box part and the auxiliary member, thermal conductivity grease and an elasticity member are interposed.

Japanese Unexamined Patent Publication No. 2011-215620 describes an optical communication module. The optical communication module includes an optical transmitting unit having a light emitting diode and a TEC, an optical receiving unit having a light receiving device, and a casing that accommodates the optical transmitting unit and the optical receiving unit. Between the optical transmitting unit and the inner surface of the casing, a first connection material that contacts the optical transmitting unit, a second connection material that contacts the inner surface of the casing, and a metal plate that is interposed between the first connection material and the second connection material are provided. The coefficient of thermal conductivity of the first connection material and the coefficient of thermal conductivity of the second connection material are both smaller than the coefficient of thermal conductivity of the metal plate. As described above, the optical transmitting unit is thermally connected to the casing through the first connection material, the metal plate, and the second connection material.

Japanese Unexamined Patent Publication No. 2014-119712 describes an optical communication module including a casing, an optical transmission element, a plurality of heat dissipation sheets, and a circuit board, and a graphite sheet member. The casing accommodates the optical transmission element, the graphite sheet member, the plurality of heat dissipation sheets, and the circuit board. The graphite sheet member extends between another heat dissipation sheet and the bottom wall of the casing from between the optical transmission element and a heat dissipation sheet placed on the bottom wall of the casing. As described above, the optical transmission element is thermally connected to the bottom wall through the heat dissipation sheet placed on the bottom wall of the casing and the graphite sheet member.

US Patent Application Publication No. 2009/0010653 describes an optical module including a cabinet and a cover. In the inside of the cabinet, an electrical substrate, the optical transceiver unit, a fixing member, and a thermally conductive sheet are accommodated. The fixing member contacts the inner surface of the cover. Between the fixing member and the optical transceiver unit, the thermally conductive sheet is interposed. Thus, the heat of the optical transceiver unit is conducted to the cover through the thermally conductive sheet and the fixing member.

US Patent Application Publication No. 2005/0158052 describes an optical transceiver including a circuit board, an optical subassembly, the thermal conduction material, and a housing. The circuit board, the optical subassembly, and the thermal conduction material are accommodated in the housing. The thermal conduction material is disposed between the optical subassembly and the circuit board. A part of the thermal conduction material extends to the outside of the housing. The thermal conduction material dissipates heat generated in the optical subassembly to the outside of the housing through the thermal conduction material.

SUMMARY

An optical transceiver according to an aspect of the present disclosure includes a housing having inner sides defining an inner space inside the housing; an optical module including a package, a semiconductor device, and a sleeve, the package being configured to house the semiconductor device, the semiconductor device generating a Joule heat, the sleeve being attached to an outside of the package, the sleeve being fixed to the housing with keeping the package away from the inner sides; a heat-conducting material filled between the package and one of the inner sides, the heat-conducting material including an oily component; and a sheet member being placed between the heat-conducting material and the package, the sheet member covering the heat-conducting material to prevent the oily component from reaching the optical module. The Joule heat is conducted from the package to the housing through the sheet member and the heat-conducting material.

DETAILED DESCRIPTION

Detail of Embodiment

Figure 1:
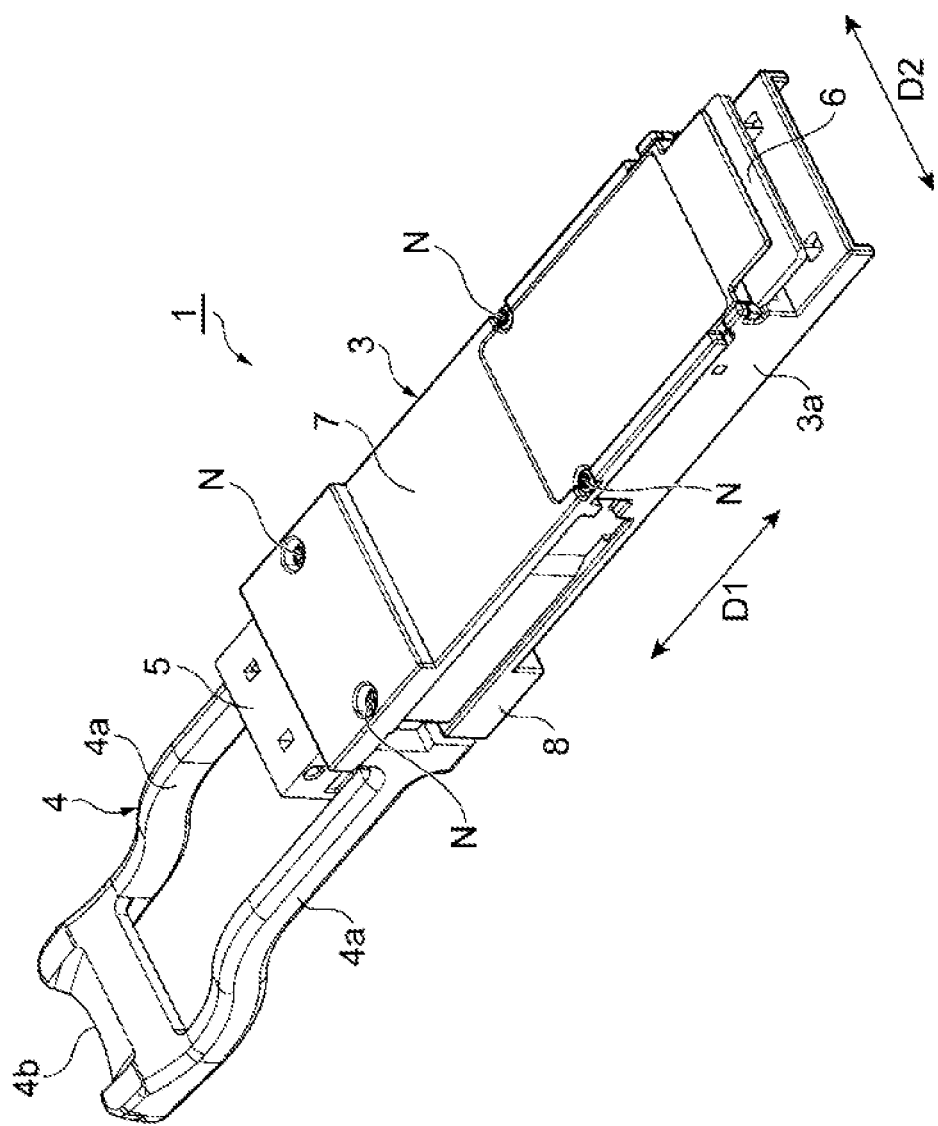
FIG. 1 is a perspective view showing an optical transceiver according to a first embodiment of the present disclosure.

In the following, a specific example of an optical transceiver according to an embodiment will be described with reference to the drawings. Note that the present invention is not limited to the following exemplifications, and the present invention is to include all alterations described in claims and in the scope equivalent to claims. In the following description, in the description of the drawings, the same or equivalent components are designated with the same reference signs, and the duplicate description is appropriately omitted. For easy understanding, the drawings are sometimes partially simplified or exaggerated, and dimensions, ratios, and any other parameters are not limited to ones described in the drawings.

Figure 2:
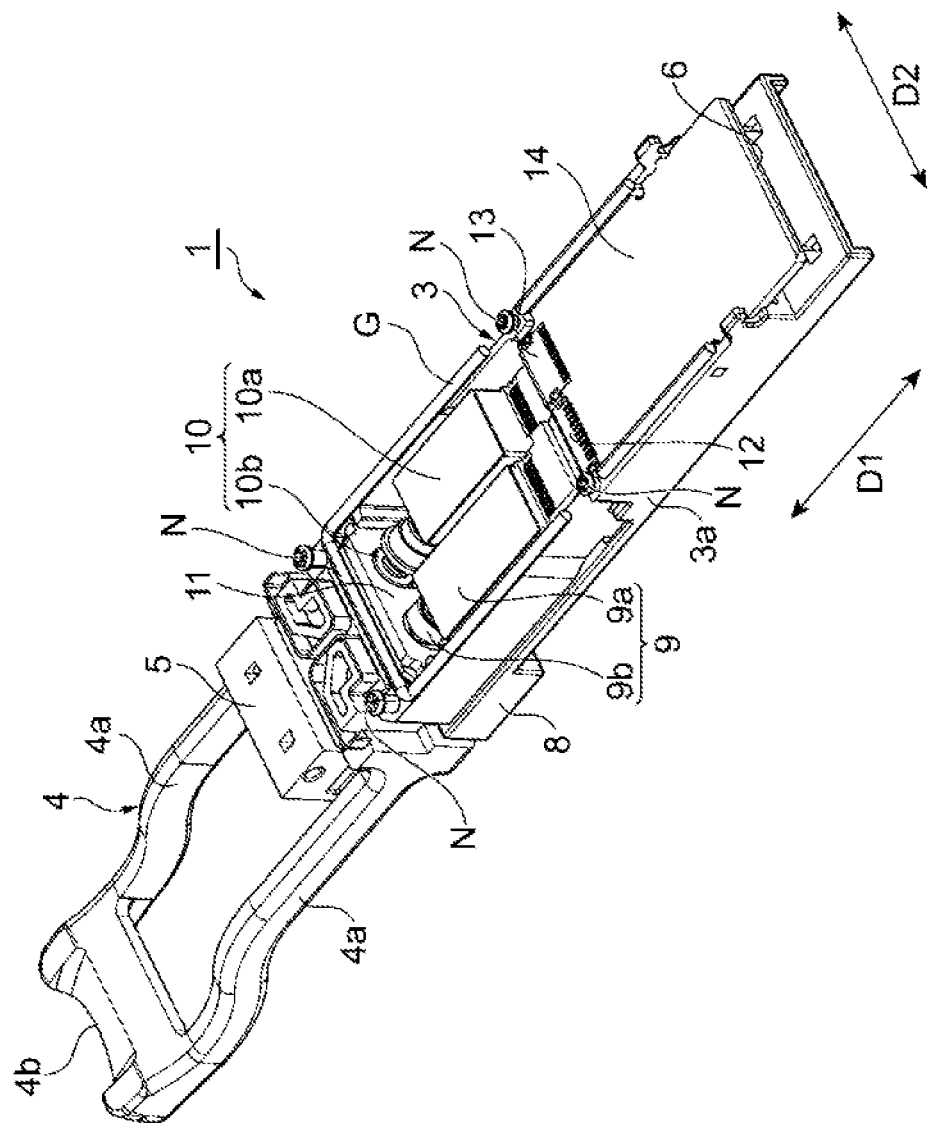
FIG. 2 is a perspective view showing the internal structure of the optical transceiver in FIG. 1.

FIG. 1 is a perspective view showing an optical transceiver 1 according to an embodiment. FIG. 2 is a perspective view showing the internal structure of the optical transceiver 1. As shown in FIGS. 1 and 2, the optical transceiver 1 is in compliance with the QSFP28 standard, for example. The optical transceiver 1 performs full duplex bi-directional optical communication. The optical transceiver 1 is inserted into and extracted from a cage provided on a host system, which is a communication apparatus, along a direction D1 that is the longitudinal direction of the optical transceiver 1. The optical transceiver 1 includes a casing 3 and a pull-tab 4. The casing 3 and the pull-tab 4 are both in a shape extending along the direction D1. The casing 3 is made of a metal. The cross sectional form of the casing 3 vertical to the direction D1 is in a rectangular shape, for example. The casing 3 has a pair of side surfaces 3a extending in the direction D1.

The pull-tab 4 is a made of a resin, for example. The pull-tab 4 is made of a material having flexibility. The pull-tab 4 has a pair of arm parts 4a extending from the end part of the casing 3 in the direction D1 and a connecting part 4b that connects the tip ends of the pair of arm parts 4a to each other. For example, the pull-tab 4 is picked with fingers to draw the pull-tab 4 in the direction D1, the engagement of the optical transceiver 1 with the host system is released, and thus the optical transceiver 1 can be extracted from the host system.

The casing 3 includes an optical receptacle 5 with which an optical connector provided at the tip end of an optical fiber cable engages. The optical receptacle 5 is provided at one end of the casing 3 in the direction D1. The casing 3 further includes an electrical plug 6 that is connected to an electrical connector provided in the inside of the cage of the host system at the other end in the direction D1. In the following description, one end side (the optical receptacle 5 side) of the casing 3 is sometimes referred to as the front side, and the other end side (the electrical plug 6 side) of the casing 3 is referred to as the rear side.

The casing 3 includes a lower casing 7 and an upper casing 8. The lower casing 7 and the upper casing 8 are joined to each other with a plurality of screws N in a state in which a gasket G is interposed. In the inside of the casing 3, a TOSA (Transmitter Optical Sub-Assembly) 9, a ROSA (Receiver Optical Sub-Assembly) 10, and a retainer 11 are accommodated. The TOSA 9 and the ROSA 10 are optical modules that are disposed side by side along a direction D2 that is the width direction of the optical transceiver 1. The retainer 11 is made of a conductive material, for example.

Figure 3:
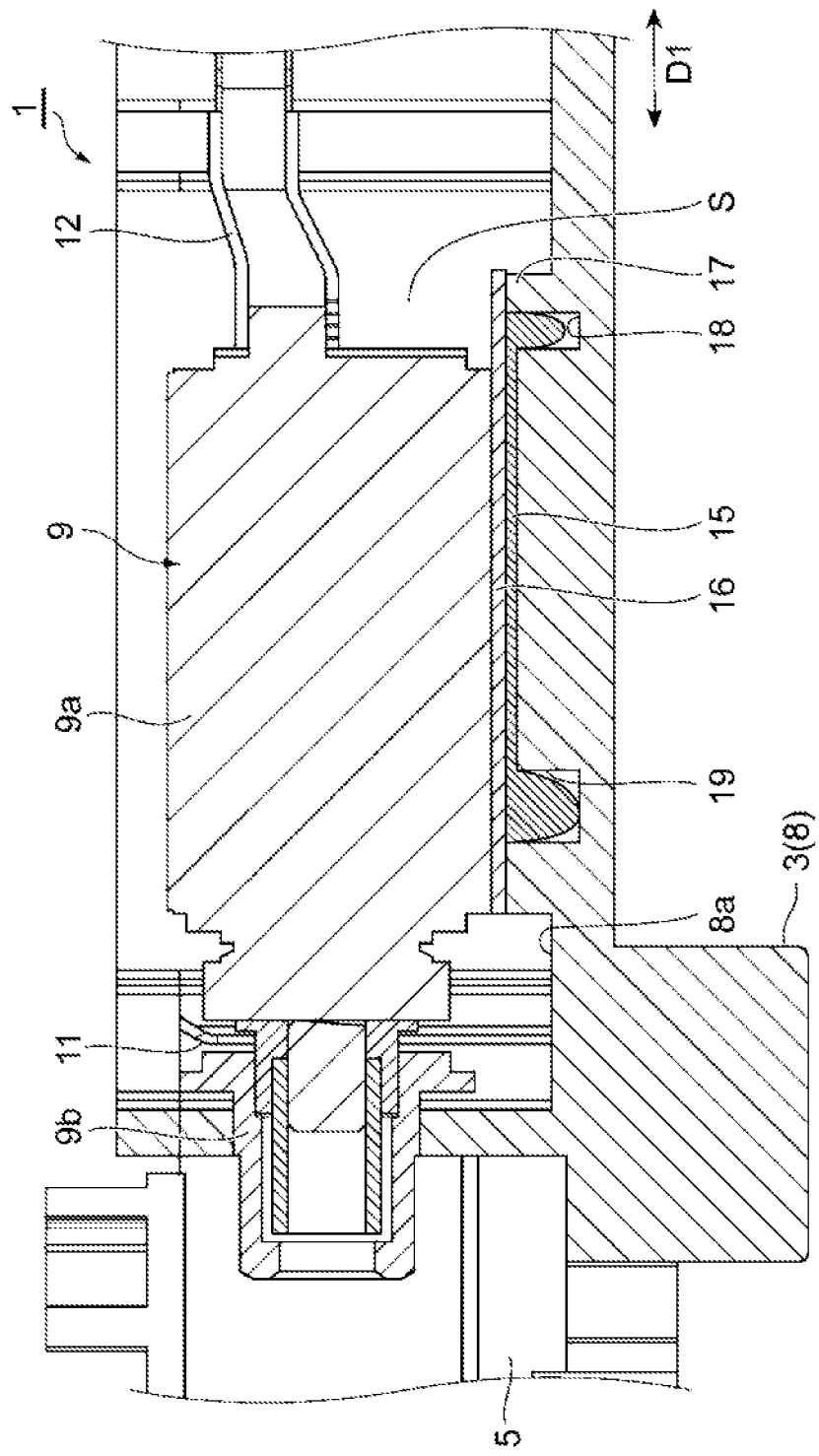
FIG. 3 is a longitudinal sectional view showing the optical transceiver in FIG. 1.

FIG. 3 is a cross sectional view showing the TOSA 9 disposed in an internal space S of the optical transceiver 1.

As shown in FIGS. 2 and 3, the TOSA 9 includes a package 9a and a sleeve 9b extending from the package 9a. In the inside of the package 9a, heating components (semiconductor device), such as a plurality of optical components, are mounted. In FIG. 3, the inside of the package 9a is omitted. The sleeve 9b is fixed to the optical receptacle 5. Into the sleeve 9b, the above-described optical connector is inserted. The package 9a shows a rectangular cuboid shape. The sleeve 9b cylindrically protrudes from the side surface (the front surface) of the package 9a. The ROSA 10 includes a package 10a and a sleeve 10b similarly to the package 9a and the sleeve 9b. The sleeve 9b and the sleeve 10b are fixed to the upper casing 8 by the retainer 11.

The front side of the sleeve 9b and the front side of the sleeve 10b are disposed so as to protrude from the rear side toward the inside of the optical receptacle 5. Optical fibers are individually inserted into the sleeve 9b and the sleeve 10b. The optical fibers are optically coupled to semiconductor devices (such as an LD and a PD) equipped on the TOSA 9 and the ROSA 10 by optical alignment.

In the optical alignment described above, optical signals passing through the optical fibers are detected on the outside of the TOSA 9 and the ROSA 10 while the sleeve 9b and the sleeve 10b are moved in directions orthogonal to the optical axes of the optical fibers (in X- and Y-directions). At the positions at which the detected optical signals reach their peaks, the sleeve 9b and the sleeve 10b are respectively fixed to the package 9a and the package 10a. The term "detected optical signals reach their peaks" expresses a state in which the optical axis of the sleeve 9b and the optical axis of the package 9a are nearly matched with each other, for example. The above-described optical alignment is performed, and thus the optimum coupling efficiency can be obtained (this is similarly applied to the optical axis of the sleeve 10b and the optical axis of the package 10a).

In the optical system of the TOSA 9, tolerance or an error is included in the dimensions of the parts that constitute the optical system or in the assembly positions of the parts of the optical system. This error sometimes varies the position of the optical axis around the design value. The above-described optical alignment is performed for compensating a degradation of coupling efficiency due to the positional displacement of the optical axis. The sleeve 9b and the sleeve 10b are made of SUS, for example. The sleeve 9b and the sleeve 10b are respectively fixed to the package 9a and the package 10a by YAG welding.

In the internal space S of the optical transceiver 1, two FPC substrates 12 and 13 and a circuit board 14 are accommodated. The FPC substrate 12 electrically connects the TOSA 9 to the circuit board 14. The FPC substrate 13 electrically connects the ROSA 10 to the circuit board 14. The ROSA 10 converts an optical signal received from the outside of the optical transceiver 1 into an electrical signal. The electrical signal is transmitted to the circuit board 14 through the FPC substrate 13.

A circuit equipped on the circuit board 14 applies signal processing to the electrical signal. The electrical signal is outputted to the host system through the electrical plug 6. On the other hand, from the host system, a transmission electrical signal is inputted to the circuit board 14 through the electrical plug 6. The electrical signal is processed by the circuit equipped on the circuit board 14, and then transmitted to the TOSA 9 through the FPC substrate 12. The TOSA 9 converts the electrical signal into an optical signal, and then outputs the optical signal to the outside of the optical transceiver 1.

In the optical transceiver 1, the internal space S of the optical transceiver 1 is formed between the lower casing 7 and the upper casing 8. The lower casing 7 and the upper casing 8 respectively have inner surfaces 7a and 8a. The upper casing 8 is fixed to the lower casing 7 such that the inner surface 7a of the lower casing 7 faces the inner surface 8a of the upper casing 8. The lower casing 7 and the upper casing 8 are joined to each other with the plurality of screws N with the gasket G sandwiched between the lower casing 7 and the upper casing 8, for example, as described above. The internal space S is defined by the inner surface 7a of the lower casing 7 and the inner surface 8a of the upper casing 8. The outer shapes of the lower casing 7 and the upper casing 8 are determined such that the optical transceiver 1 is compliant with the industrial standard (e.g. MSA (Multi Source Agreement)). In the internal space S, components (parts) that are necessary to the optical transceiver 1 to perform a predetermined function are accommodated. For example, in the internal space S of the optical transceiver 1, a heat dissipation gel 15 (heat dissipation material, heat-conducting material) and a sheet member 16 are further accommodated. The casing 3 (the upper casing 8) has the inner surface 8a that defines the internal space S. The heat dissipation gel 15 and the sheet member 16 are placed on the inner surface 8a of the upper casing 8. On the sheet member 16, the TOSA 9 is placed. The heat dissipation gel 15 is interposed between the package 9a of the TOSA 9 and the inner surface 8a. The sheet member 16 is interposed between the heat dissipation gel 15 and the package 9a. The sheet member 16 has a heat dissipation property similarly to the heat dissipation gel 15, for example.

Figure 4:
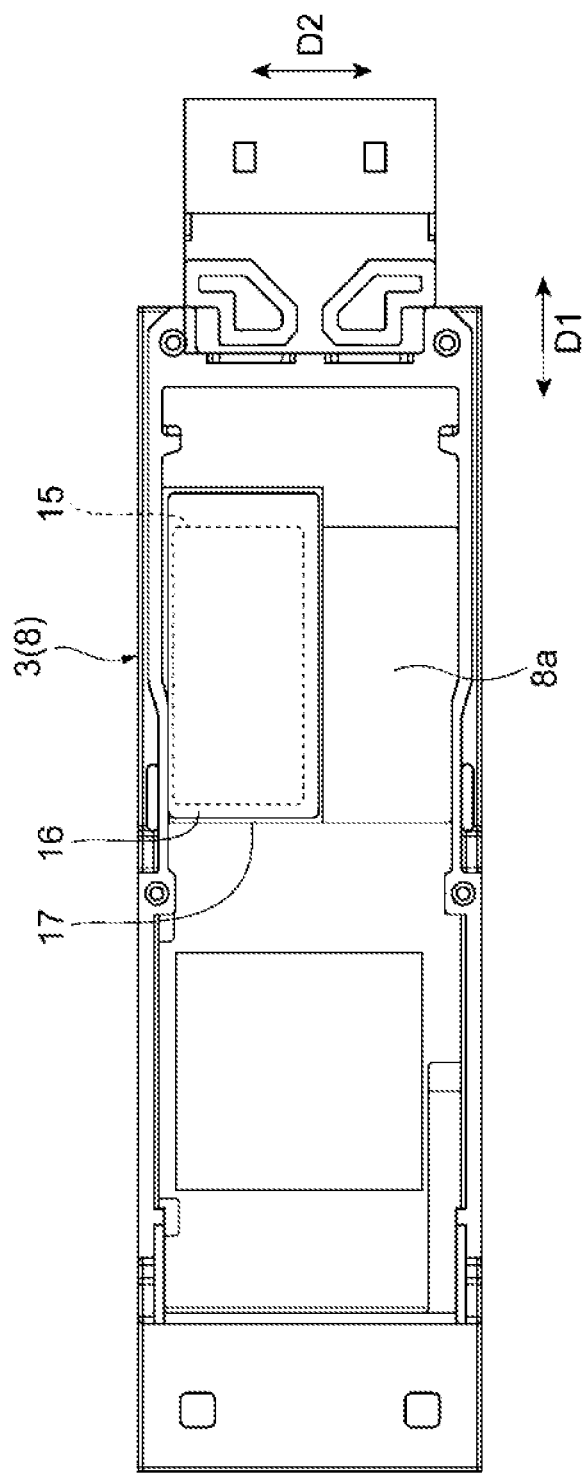
FIG. 4 is a plan view showing the inner surface of a housing, a heat dissipation material, and a sheet member of the optical transceiver in FIG. 1.

FIG. 4 is a plan view showing the inner surface 8a of the upper casing 8, the heat dissipation gel 15, and the sheet member 16. As shown in FIGS. 3 and 4, the inner surface 8a of the upper casing 8 is formed with a projection 17 (outer base) that protrudes on the inner side (the lower casing 7 side) of the optical transceiver 1, a recess 18 that is hollowed on the outer side (on the opposite side of the lower casing 7) of the optical transceiver 1, and a projection 19 (inner base) that protrudes to the recess 18 on the opposite side of the recess 18 to the projection 17. The height of the projection 19 to the recess 18 is lower than the height of the projection 17 to the recess 18.

The recess 18 and the projection 19 are regions into which the heat dissipation gel 15 is entered. The projection 17 is a region on which the sheet member 16 that covers the heat dissipation gel 15 is placed. For example, the recess 18 is formed in a frame shape that surrounds the projection 19. The projection 17 is formed in a frame shape that surrounds the recess 18. As an example, the projection 19 is in a rectangular shape that extends both in the direction D1 and in the direction D2. The recess 18 and the projection 17 are in a rectangular frame shape that extends both in the direction D1 and in the direction D2.

The heat dissipation gel 15 is packed on the projection 19 and the recess 18, and an excess of the heat dissipation gel 15 is entered into the recess 18. The recess 18 is provided to accept the excess heat dissipation gel 15. The heat dissipation gel 15 is a heat dissipation member (thermally conductive gel) having elasticity as well as a heat transfer property, for example. The heat dissipation gel 15 is placed on the recess 18 and the projection 19, and in the intimate contact with the sheet member 16 and the inner surface 8a of the upper casing 8. Thus, the heat dissipation gel 15 thermally and physically contacts the TOSA 9 through the sheet member 16. The heat of the TOSA 9 is conducted to the upper casing 8 through the sheet member 16 and the heat dissipation gel 15, and is released from the upper casing 8 to the outside of the optical transceiver 1.

The heat dissipation gel 15 contains an oil component. The heat dissipation gel 15 contains silicone oil, for example. In this case, since the osmotic pressure of the heat dissipation gel 15 is low due to a small number of crosslinks of silicone, the heat dissipation gel 15 easily makes a bleed. The term "bleed" expresses that the oil component of the heat dissipation gel 15 slowly spreads and penetrates. Consequently, for example, in the case in which the heat dissipation gel 15 directly contacts the TOSA 9, there is a possibility that the oil component of the heat dissipation gel 15 goes to the inside of the package 9a or the sleeve 9b of the TOSA 9.

Therefore, in the present embodiment, the sheet member 16 is interposed between the heat dissipation gel 15 and the package 9a of the TOSA 9. The sheet member 16 is fixed to the projection 17 of the upper casing 8 with adhesive tape, for example. Even in the case in which the package 9a is pressed against the heat dissipation gel 15 by the sheet member 16 through the sheet member 16, it can be suppressed that the heat dissipation gel 15 sneaks into the sleeve 9b of the TOSA 9, i.e., the heat dissipation gel 15 sneaks into the YAG-welded part described above.

The sheet member 16 is a sheet-like member that does not penetrate the oil component of the heat dissipation gel 15. The sheet member 16 has a high thermal conductivity. For example, the coefficient of thermal conductivity of the sheet member 16 is 0.5 W (m·K) or more and 5.0 W (m·K) or less, or is 0.72 W/(m·K), for example. The thickness of the sheet member 16 is 0.2 mm or more and 0.8 mm or less, for example, or is 0.5 mm, for example. The sheet member 16 may have much higher insulating properties. The sheet member 16 may have reattaching properties (the sheet member 16 may be attached again). In this case, rework can be easily performed. The sheet member 16 may be a material having a low electrification property. For example, the sheet member 16 is polyimide tape, Kapton tape, or a graphite sheet.

Figure 5:
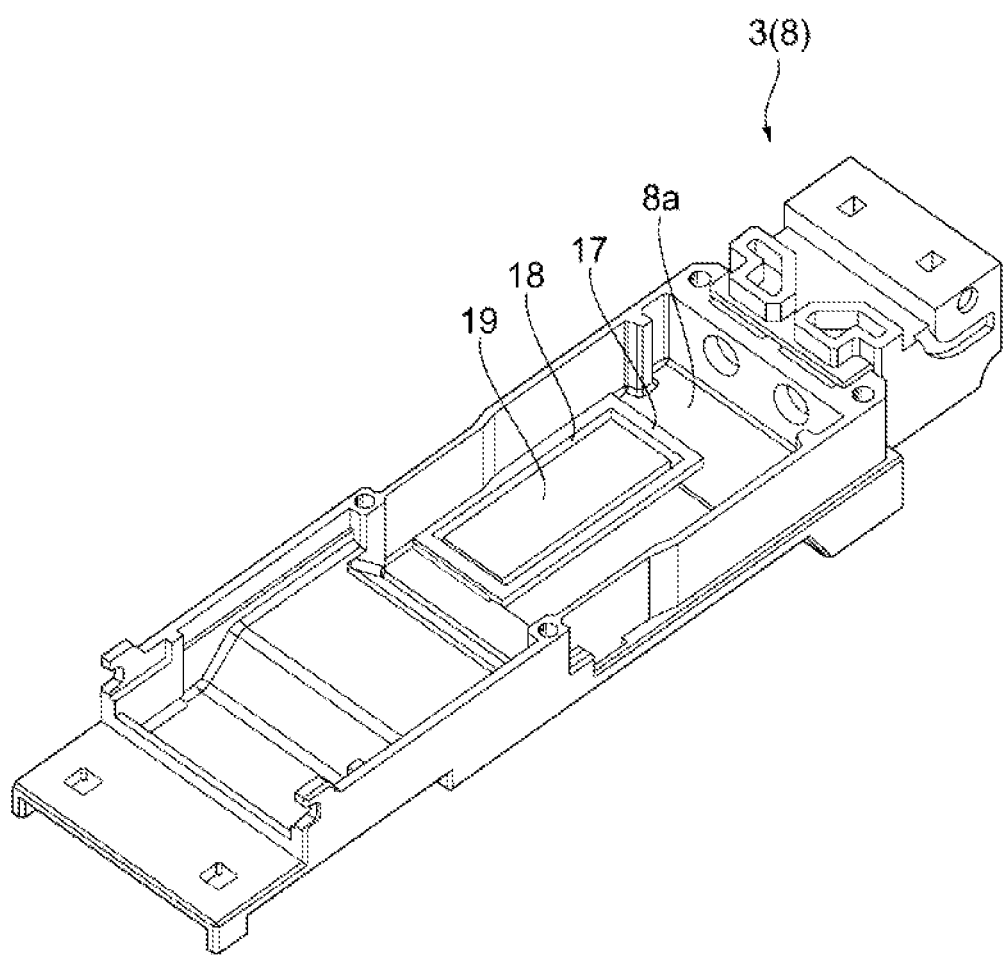
FIG. 5 is a perspective view showing the inner surface of the housing in FIG. 4.
Figure 6:
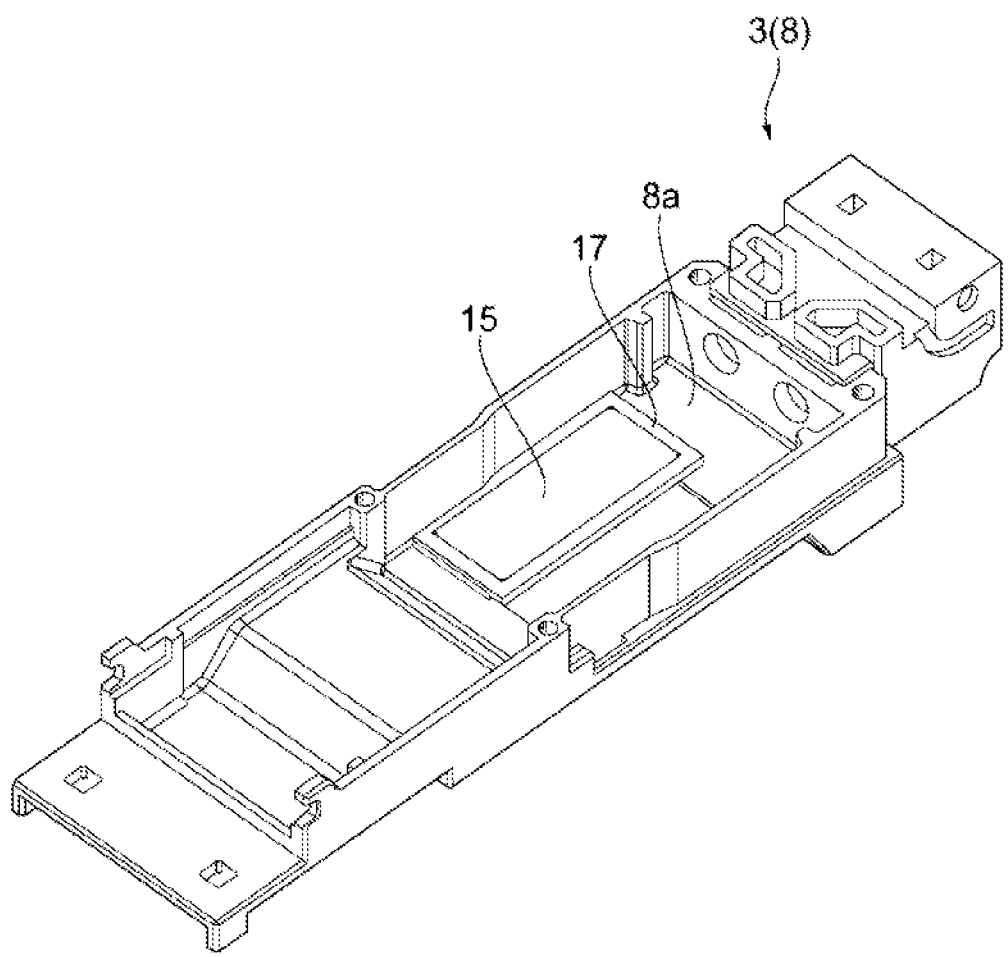
FIG. 6 is a perspective view showing an example state in which a heat dissipation material is packed on the inner surface of the housing in FIG. 5.
Figure 7:
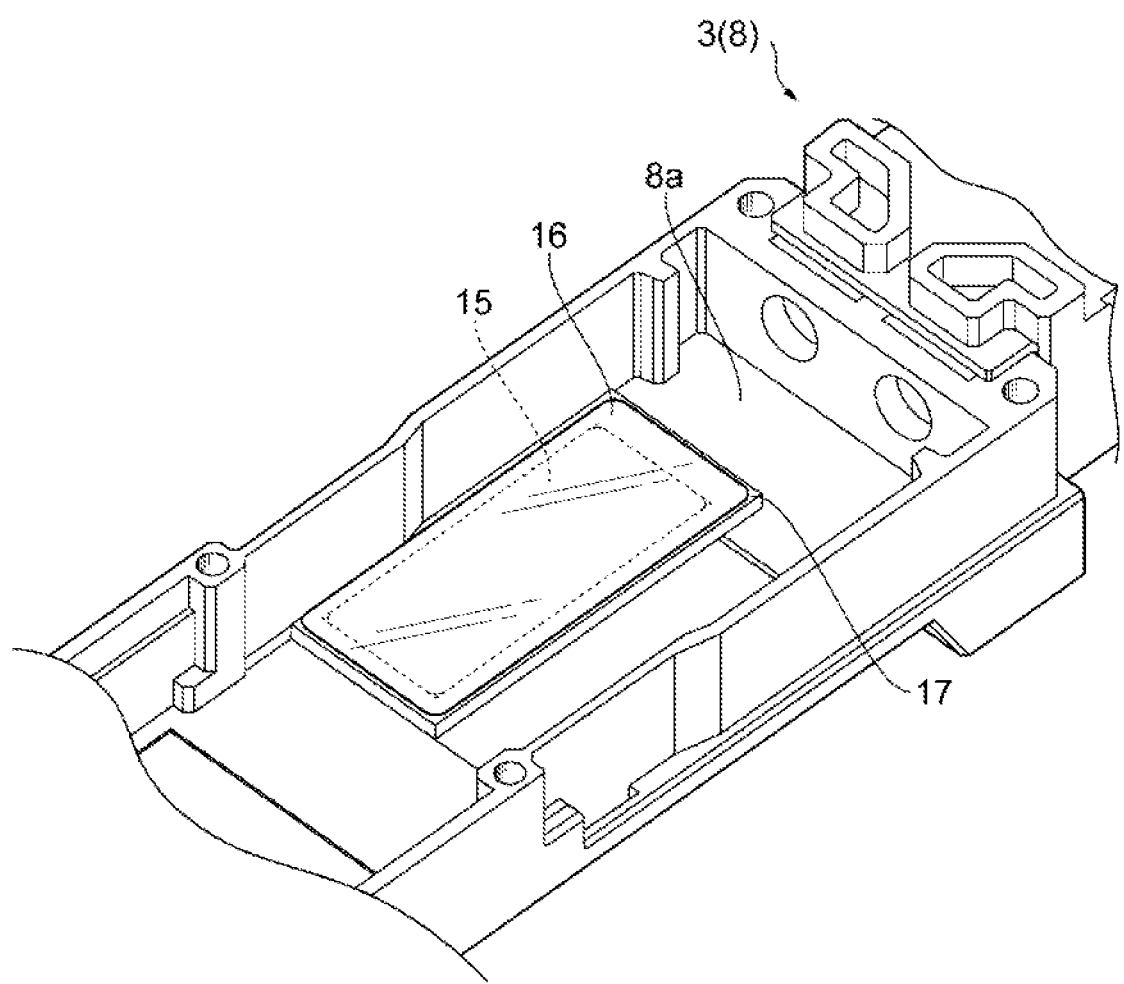
FIG. 7 is a perspective view showing an example state in which the sheet member is placed on the heat dissipation material in FIG. 6.

Next, the procedures of disposing the heat dissipation gel 15 and the sheet member 16 will be described with reference to FIGS. 5 to 7. First, as shown in FIG. 5, the upper casing 8 is prepared, and a state is made in which the inner surface 8a of the upper casing 8 (the projection 17, the recess 18, and the projection 19) are directed upward, for example. As shown in FIG. 6, on the recess 18 and the projection 19 located on the inner side of the projection 17 on the inner surface 8a of the upper casing 8, the heat dissipation gel 15 is packed.

At this time, for example, the heat dissipation gel 15 is packed such that the height of the heat dissipation gel 15 is almost the same as the height of the projection 17. Subsequently, as shown in FIG. 7, the sheet member 16 is attached to the heat dissipation gel 15 and the projection 17. The sheet member 16 may be transparent. In this case, it is possible to confirm whether the heat dissipation gel 15 is packed enough under the sheet member 16. However, the sheet member 16 may be translucent or opaque. In the attachment, the outer edge of the sheet member 16 is attached to the projection 17 to seal the heat dissipation gel 15, and an excess of the heat dissipation gel 15 by pressing the heat dissipation gel 15 is entered to the recess 18. After that, the TOSA 9 is placed on the sheet member 16, the parts are disposed in the inside of the upper casing 8, the lower casing 7 is joined, and then the assembly of the optical transceiver 1 is completed.

Figure 8:
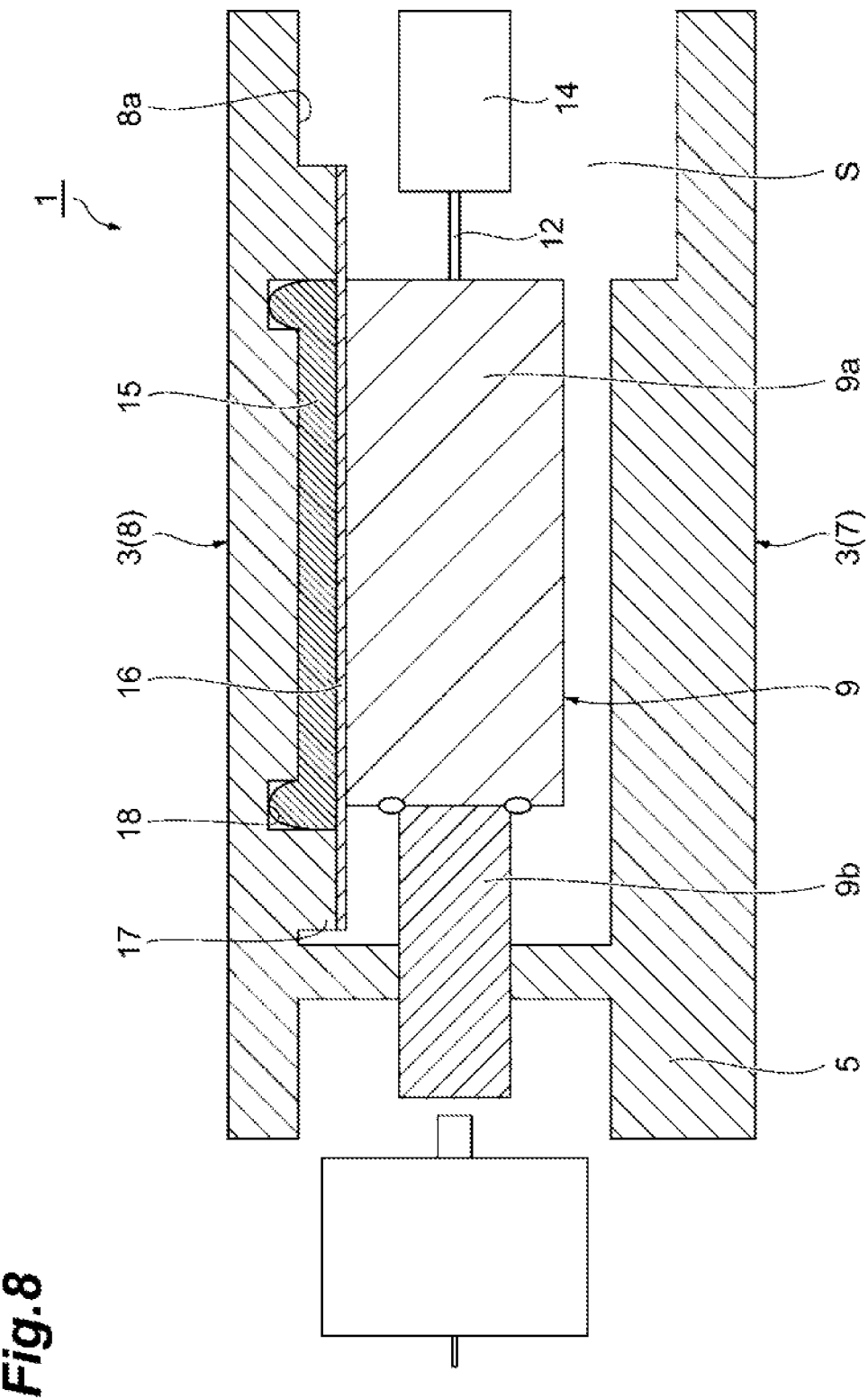
FIG. 8 is a longitudinal sectional view schematically showing the internal structure of the optical transceiver in FIG. 1.

Next, the operation and effect obtained from the optical transceiver 1 according to the present embodiment will be described in detail. As schematically shown in FIG. 8, the optical transceiver 1 includes the casing 3 having the internal space S and the inner surface 8a that defines the internal space S, and the TOSA 9 that is provided in the internal space S of the casing 3. The TOSA 9 has the package 9a that is accommodated in the internal space S of the casing 3 and that accommodates the heating element, and the sleeve 9b that is installed on the package 9a and that is fixed to the casing 3. Between the package 9a and the inner surface 8a of the casing 3, the sheet member 16 and the heat dissipation gel 15 having the heat dissipation properties are interposed, and the heat dissipation gel 15 contacts the inner surface 8a.

Therefore, the heat (Joule heat) generated from the heating element in the inside of the package 9a is conducted to the inner surface 8a of the casing 3 through the sheet member 16 and the heat dissipation gel 15, and thus the heat dissipation property of the TOSA 9 can be improved. Between the heat dissipation gel 15 and the package 9a, the sheet member 16 having the heat dissipation property is interposed. The sheet member 16 suppresses the penetration of the oil component of the heat dissipation gel 15 to the package 9a. Therefore, the leakage of the heat dissipation gel 15 to the package 9a can be suppressed, as well as the penetration of the oil component of the heat dissipation gel 15 to in the inside of the package 9a can be avoided.

In the optical transceiver 1 according to the present embodiment, the casing 3 has the projection 17 that is formed on the inner surface 8a protruding in the outer direction of the inner surface 8a, that surrounds the heat dissipation gel 15 along the inner surface 8a, and that has, at the portion which most protrudes in the outer direction of the inner surface 8a, a flat surface vertical to the outer direction of the inner surface 8a, and the sheet member 16 is attached to the flat surface. Consequently, the heat dissipation gel 15 is surrounded by the projection 17, and thus the leakage of the heat dissipation gel 15 can be more reliably suppressed. Since the sheet member 16 is attached to the projection 17 that surrounds the heat dissipation gel 15, the heat dissipation gel 15 is surrounded from a plurality of different directions with each other by the projection 17 and the sheet member 16. That is, the heat dissipation gel 15 is sealed by the projection 17 and the sheet member 16. Therefore, the penetration of the oil component of the heat dissipation gel 15 to the package 9a can be more reliably avoided.

The optical transceiver 1 according to the present embodiment has the recess 18 that is formed on the inner side of the projection 17 on the inner surface 8a and that accommodates a part of the heat dissipation gel 15. On the inner surface 8a of the casing 3, the recess 18, into which a part of the heat dissipation gel 15 is extruded, is formed. Consequently, since an excess of the packed heat dissipation gel 15 can be extruded into the recess 18, a rather large quantity of the heat dissipation gel 15 is packed, and thus the adhesion of the heat dissipation gel 15 to the inner surface 8a of the casing 3 and the sheet member 16 can be more improved. Therefore, the Joule heat generated from the heating component in the inside of the package 9a can be more sufficiently conducted to the casing 3 through the sheet member 16 and the heat dissipation gel 15. As a result, the heat dissipation of the heating component in the inside of the package 9a to the outside of the optical transceiver 1 can be more effectively performed.

In the present embodiment, the thickness of the sheet member 16 is 0.2 mm or more and 0.8 mm or less. Therefore, the penetration of the oil component of the heat dissipation gel 15 to the package 9a can be suppressed as well as the thickness of the sheet member 16 can be made thinner, which is not too thick.

As described above, the embodiment of the optical transceiver according to the present disclosure is described. However, the present invention is not limited to the foregoing embodiment. That is, a person skilled in the art easily recognizes that the present invention can be variously modified and altered within the scope of the gist described in claims. For example, the shapes, sizes, materials, numbers, and disposition forms of the sheet member 16 are appropriately changeable.

For example, in the foregoing embodiment, an example is described in which the projection 17, into which the heat dissipation gel 15 is entered, is in a frame shape. However, the projection 17 may be in other shapes other than a frame shape. For example, instead of the projection 17, a projection in a shape may be included in which the circuit board 14 side is opened (for example, a U-shape). Also in this case, the sheet member 16 can suppress the leakage of the heat dissipation gel 15 to the TOSA 9 (the sleeve 9b). Moreover, the shapes, sizes, numbers, and disposition forms of the recess 18 and the projection 19 are also appropriately changeable.

In the foregoing embodiment, an example is described in which the TOSA 9 including the package 9a and the sleeve 9b is placed as an optical module on the sheet member 16 and the heat dissipation gel 15. However, the optical module may be the ROSA 10, for example, or may be an optical module other than the TOSA 9 or the ROSA 10. As described above, the present invention is applicable to various optical modules. Moreover, in the foregoing embodiment, the optical transceiver 1 that is in compliance with the QSFP28 standard and that performs full duplex bi-directional optical communication is described. However, the optical transceiver according to the present invention may be optical transceivers that are in compliance with the standard, such as the SFP standard, other than the QSFP28 standard, for example.

What is claimed is:
1. An optical transceiver comprising:
   a housing having inner sides defining an inner space inside the housing, the inner sides extending along a longitudinal direction and a width direction of the optical transceiver, the width direction crossing the longitudinal direction;
   an optical module including a package and a sleeve, the package generating a Joule heat, the sleeve being attached to an outside of the package, the sleeve being fixed to the housing keeping the package away from the inner sides;
   a heat-conducting material filled between the package and one of the inner sides, the heat-conducting material including an oily component; and
   a sheet member being interposed between the heat-conducting material and the package in a height direction perpendicular to the longitudinal direction and the width direction, the sheet member covering the heat-conducting material to prevent the oily component from reaching the optical module, the sheet member including the heat-conducting material inside in a plane view of the one of the inner sides;
   wherein the Joule heat is conducted from the package to the housing through the sheet member and the heat-conducting material, wherein the housing has an outer base and inner base each extending from the one of the inner sides along the height direction, wherein the inner base is inside the outer base, when viewing from the height direction, wherein the housing has a depression filled with the heat-conducting material, wherein the outer base has a first top surface parallel to the one of the inner sides, and wherein the sheet member is attached to the first top surface for sealing the heat-conducting material in the outer base.

2. The optical transceiver according to claim 1, wherein the inner base has a second top surface having a lower height from the one of the inner sides to a bottom surface, wherein the lower height is lower than a higher height from the one of the inner sides to the first top surface.

3. The optical transceiver according to claim 1, wherein the sheet member has a thickness from 0.2 mm to 0.8 mm.

\* \* \* \* \*